United States Patent [19]

Suplicki

[11] 4,450,072

[45] May 22, 1984

[54] AIR FLOTATION CELL

[76] Inventor: John C. Suplicki, 1813 Michelle La., Lakeland, Fla. 33803

[21] Appl. No.: 442,299

[22] Filed: Nov. 17, 1982

[51] Int. Cl.³ ............................................. B03D 1/24
[52] U.S. Cl. .............................. 209/170; 261/114 A; 261/123
[58] Field of Search ............... 209/162, 163, 168, 170; 261/114 A, 123

[56] References Cited

U.S. PATENT DOCUMENTS

| | | | |
|---|---|---|---|
| 2,510,589 | 6/1950 | Kraft | 261/114 A |
| 3,230,055 | 1/1966 | Wolfrom | 261/153 |
| 4,028,229 | 6/1977 | Dell | 209/170 |
| 4,287,054 | 9/1981 | Hollingsworth | 209/170 |

Primary Examiner—Tim R. Miles
Attorney, Agent, or Firm—Cushman, Darby & Cushman

[57] ABSTRACT

The invention relates to an air flotation cell suitable for use in mineral concentration operations and in waste water treatment. The air flotation cell eliminates the need for aspirators and constriction plates by employing a plenum chamber beneath the flotation chamber. A plurality of static shear tubes connect the two chambers and provide a uniform dispersion of aerated water for the flotation chamber. A similar device is used in the floor plate of the feed well to facilitate the flotation of the aqueous pulp feed.

12 Claims, 2 Drawing Figures

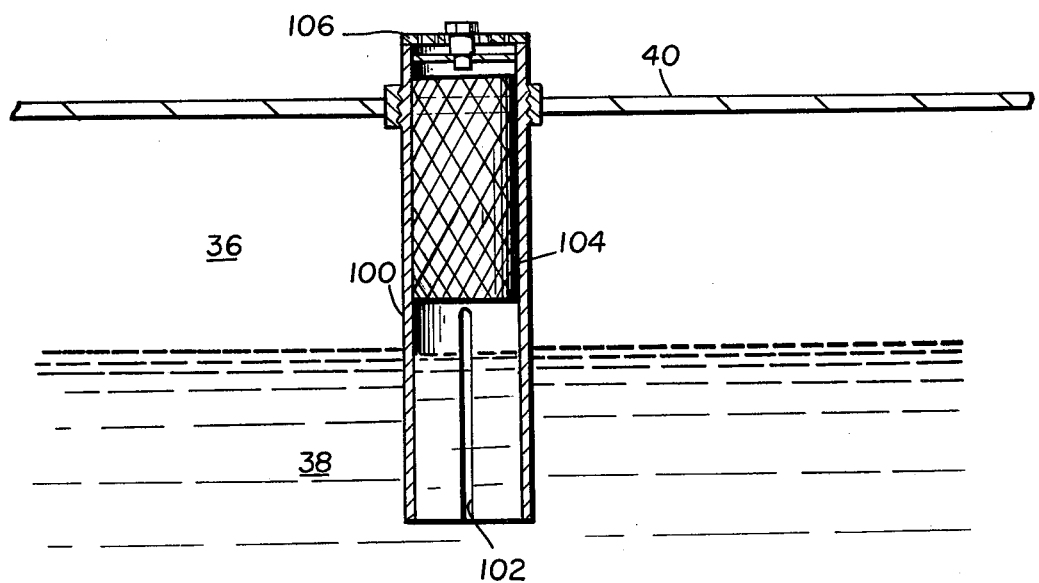

AIR FLOTATION CELL

BACKGROUND OF THE INVENTION

1. Field of the Invention

The present invention relates to a new and novel air flotation cell which can be used in a number of different services including concentration of mineral ores and waste water treatment such as oil removal from refinery waste waters and fiber recovery in the pulp and paper industry.

2. Description of the Prior Art

Commercially valuable minerals, for example, metal sulfides, apatitic phosphates and the like, are commonly found in nature mixed with relatively large quantities of gangue materials, and as a consequence it is usually necessary to beneficiate the ores in order to concentrate the mineral content thereof. Mixtures of finely divided mineral particles and finely divided gangue particles can be separated and a mineral concentrate obtained therefrom by well known froth flotation techniques. Broadly speaking, froth flotation involves conditioning an aqueous slurry or pulp of the mixture of mineral and gangue particles with one or more flotation reagents which will promote flotation of either the mineral or the gangue constituents of the pulp where the pulp is aerated. The conditioned pulp is aerated by introducing into the pulp a plurality of minute air bubbles which tend to become attached either to the mineral particles or to the gangue particles of the pulp, thereby causing these particles to rise to the surface of the body of pulp and form thereat a float fraction which overflows or is withdrawn from the flotation apparatus.

Typical of such flotation apparatus for accomplishing the foregoing is that disclosed in U.S. Pat. No. 3,371,779. In such apparatus, the conditioned pulp is introduced into a flotation compartment containing a relatively quiescent body of an aqueous pulp, and aerated water is introduced into the lower portion of the flotation compartment through orifices formed in the bottom wall of the flotation compartment. A body of aerated water is established in a hydraulic compartment disposed directly below the flotation compartment by introducing air and water into the hydraulic compartment while simultaneously dispersing a multitude of fine air bubbles throughout the water in the hydraulic compartment. The body of aerated water in the hydraulic compartment is in fluid communication with the aqueous pulp in the lower portion of the flotation compartment through the aforementioned orifices formed in the bottom wall of the flotation compartment. An overflow fraction containing floated particles of the pulp is withdrawn from the top of the body of aqueous pulp and an underflow or non-float fraction containing non-floated particles of the pulp is withdrawn from the pulp in the lower portion of the flotation compartment.

However, the device disclosed in the Hollingsworth et al U.S. Pat. No. 3,371,779 also has several disadvantages which were sought to be corrected by Hollingsworth in his subsequent patent, U.S. Pat. No. 4,287,054. Specifically, this latter patent is directed to the problems that there was no aeration immediately above the discharge pipe and that the coarser ore particles settled out on the constriction plate thereby inhibiting the passage of aerated water into the flotation cell.

To overcome the problem of no aeration immediately above the discharge pipe, U.S. Pat. No. 4,287,054 provides means for introducing air bubbles into the discharge pipe via orifices in the discharge pipe in communication with the hydraulic chamber or by employing an auxiliary aerating chamber above or below the discharge pipe. Other improvements shown in U.S. Pat. No. 4,287,054 include installing baffle plates attached to the constriction plates, and providing the bottom constriction plate with a slope either toward the central discharge pipe or the wall.

However, these flotation devices suffer from the disadvantage of having to use aspirators to form an intimate dispersion of fine bubbles throughout the water in the hydraulic chamber, and because aspirators do not permit the individual control of the air and water, such devices are difficult to operate. In addition, aspirators have a tendency to plug when unfiltered recycle water is used in the flotation devices.

Another problem with these devices is the possible plugging of the holes in the constriction plate in that they employ a large number of relatively small holes which are easily blocked.

Other examples of prior art relating to flotation are disclosed in, U.S. Pat. Nos. 1,192,228, 1,223,033, 3,012,670, 3,032,199, and 4,341,630.

SUMMARY OF THE INVENTION

The apparatus of the present invention solves the foregoing problems by using a number of relatively large static shear tubes connecting a flotation chamber and a plenum chamber. The static shear tubes when used in conjunction with a surfactant generate minute bubbles which are distributed uniformly throughout the flotation chamber. Aspirators and aperture constriction plates are not required.

Slots are provided in the lower portion of the static shear tube for even distribution of the air. A distribution cap or nozzle is located on the upper portion of the tube inside the flotation chamber. This distributes the air-water mixture evenly across the bottom of the flotation chamber.

A static shear tube is also located in the feed distribution box at the top of the flotation chamber.

The plenum chamber which is located below and adjacent to the flotation chamber is only partially full of water. In operation, the plenum chamber contains an upper layer of air and a lower layer of water. The level of the water in the plenum chamber is controlled so that the air distribution slots are only partially immersed in the water. The upper portion of air distribution slots must be free of the water so that sufficient amounts of air can enter the slots for aeration of the water.

Thus, by using the static shear tubes and a plenum chamber filled only partially with water, the air and water feeds can be controlled independently of each other, and the water does not have to be pre-aerated before being fed into the plenum chamber. Separate control of the air and water feed provide the operator with the ability to vary and control, inter alia, bubble size, the air/water ratio and bulk rise rate. Moreover, the geometry of the flotation chamber may be designed for different chamber feeds, and float and sink products. Therefore, the apparatus of the present invention can be used not only to concentrate mineral oils but to also treat waste water, for example, to remove oil from refinery waste water and fibers in the paper and pulp industry.

Furthermore, because of the unique design of the present invention, the plenum chamber may be physically separate from the flotation chamber with the two chambers connected by piping.

In operation, water and a surfactant are fed into the plenum chamber, and enter the bottom of the static shear tube. Preferably, the water and surfactant are mixed prior to being fed into the plenum chamber. Air, which may be fed separately into the plenum chamber, is maintained as a separate layer above the water in the plenum chamber. The air and water layers are maintained at predetermined levels by controlling the relative pressures and volumes. Air from the plenum chamber enters the tube by means of the air distribution slots. As the air and water rise in the static shear tube, they are mixed in the static shear element of the tube thereby forming minute bubbles. The distribution cap located just inside of the flotation chamber prevents these minute bubbles from rising straight up in the flotation chamber and the aerated water is instead distributed uniformly across the bottom of the flotation chamber. The rising bubbles then attached to the hydrophobic surfaces of the feed particles and float the particles to the surface of the flotation chamber for removal. The heavier and hydrophillic particles will sink to the floor of the flotation chamber and can then be removed. The floor of the flotation may be inclined either toward the discharge pipe or the walls to facilitate the removal of the particles which settle on the floor.

The number and size of the static shear tubes can vary according to the chamber geometry and the float and sink products.

The air flotation cell of the present invention also employs a unique pulp feed well. The structure of feed well of the present invention is similar in external construction to the feed well of Hollingsworth U.S. Pat. No. 4,287,054 in that there is a pulp feed well, a slotted dispersion sleeve, and a lower conical bottom portion. However, Hollingsworth uses an aerated water feed from aspirators as feed to the lower conical portion of the feed well. This aerated water then passes upwardly through a series of spaced, aperture, constriction plates therein to provide an aerated body of water which carries the floatable fractions from the pulp aqueous feed upwardly and horizontally into the flotation chamber.

The present invention instead of using aspirated water and spaced, apertured, constriction plates employs a static shear tube similar in design and operation to those employed in the plenum chamber. Air, water and surfactant are fed into the bottom conical portion of the feed well by one or more inlets from feed means and separate into an upper air layer and a lower layer of water and surfactant. As in the plenum chamber, the air and water layers are maintained at predetermined levels by controlling the relative pressures and volumes. Also, as with the plenum chamber, the air can be fed separately or together with the water into the feed well. Preferably, the surfactant is mixed with the water prior to being fed to the feed well. The static shear tube is positioned so that the air distribution slots are partially in the water layer and partially in the air layer. The air is then intimately mixed with the water and surfactant in the static shear tube by the static shear element thereby forming minute air bubbles. This intimate mixture of air and water rises through the static shear tube and is distributed across the feed well plate by means of a distribution cap. This aerated water then acts in the same manner as the aspirated water in Hollingsworth U.S. Pat. No. 4,287,054.

In view of the foregoing it is the object of this invention to provide for improvements in air flotation cells to improve the efficiency in operation and provide for their use in services other than mineral concentration.

The above-mentioned and other features and objects of this then will become apparent and the invention itself will be best understood by reference to the following description of embodiments of the invention as presented in the accompaning figures.

It is also understood that the entire disclosures of both U.S. Pat. Nos. 3,371,779 and 4,287,054 are hereby incorporated by reference.

BRIEF DESCRIPTION OF THE DRAWINGS

FIG. 2 is a schematic cross-section view of an static shear tube of the present invention the operation.

DETAILED DESCRIPTION OF THE DRAWINGS AND OF THE INVENTION

Figure 1:
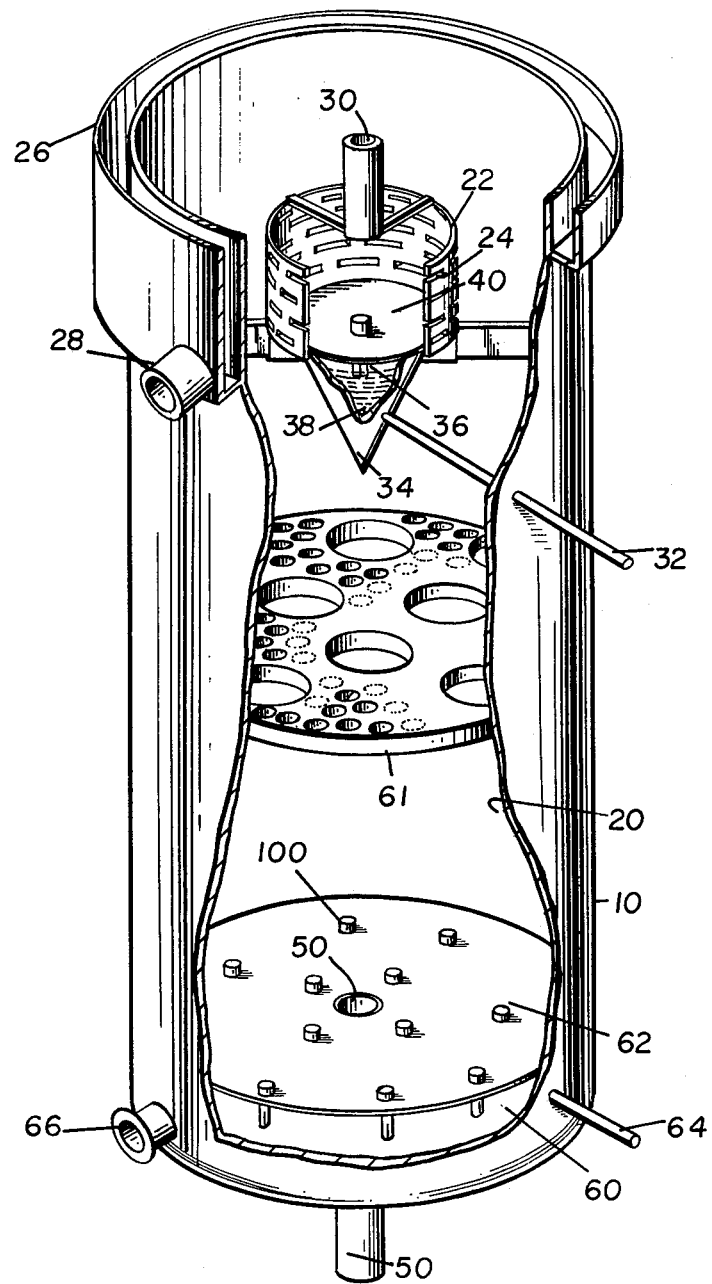
FIG. 1 is a perspective view partially broken away and sectioned for clarity of illustration of an air flotation cell of the present invention.

Referring to FIG. 1, the air flotation cell 10 comprises a flotation chamber 20 and a plenum chamber 60. The flotation chamber is designed to contain a quantity of aqueous pulp which is to be separated into float and non-float fractions. A pulp feed well 22 is provided adjacent the upper end of the air flotation chamber 20 for introducing a conditioned aqueous pulp into the flotation chamber 20. A slotted dispersion sleeve 24 coxially surrounds the feed well 22. An annular froth overflow chamber 26 is provided adjacent to the upper end of the flotation chamber 20 for withdrawing the float fraction thereof. A radial launder (not shown) may also be incorporated for a quicker removal of the froth. The froth is discharged from the overflow chamber 26 by means of an overflow discharge 28. A pulp feed inlet 30 is provided for feeding the aqueous pulp into the pulp feed well 22. The feed well 22 is comprised of a chamber having an open upper end and a closed bottom, preferable conical in shape. A feed well plate divides the chamber into upper and lower compartments.

One or more air, water and surfactant inlets 32 from feed means are connected to the lower compartment 34 of the pulp feed well 22. Air may be fed in by a separate inlet or may be fed simultaneously with a water and surfactant mixture through the same inlet. In the bottom conical portion 34 of the feed well, there is maintained an upper air layer 36 and a lower layer of water and surfactant 38.

The lower compartment 34 of the feed well is defined at its upper part by a feed well plate 40. Extending through the feed well plate 40 are one or more static shear tubes 100. One tube may even project into and/or above the pulp feed inlet 30 to increase aeration (not shown).

The basic structure of the static shear tubes is shown in FIG. 2. The static shear tube is, in essence, an inline static mixer which intimately mixes air and water to form a dispersion of minute bubbles throughout the water.

The inline static mixer can be of any known type. An example of such a mixer is a Lightnin' Inliner with a one inch diameter and a five inch length. Wadded nylon mesh inserted into the shear element has also performed successfully. Any internal structure which accomplishes an intimate mixing of the air and water can be used in or as the shear element. In operation, the pressures for the air and water as they are fed into the tubes must necessarily be greater the hydrostatic head of the flotation chamber in water to prevent the contents of the flotation chamber from flowing into the plenum chamber. The volumes of air and water entering the tubes must be maintained at predetermined quantities depending upon the particular application. The number and sizes of the tubes will also necessarily relate to the air and water volumes employed for any given application. The amount of water will vary depending, inter alia, on the required bulk upward velocity for the particular being floated.

The velocities of the air and water through the tubes will determined the bubble size.

FIG. 2 is merely one embodiment of a static shear tube which can be effectively employed in the present invention.

The static shear tube 100 comprises three main elements. The lower portion of the tube has one or more air distribution slots 102 in the tube. These can be of any configuration such as windows or aperatures cut into the tube (not shown) or, as illustrated, long narrow slots extending upwardly from the bottom of the tube.

The second main element of the static shear tube 100 is the static shear element 104 which is located above the air distribution slots 102. The purpose of the static shear element is to effect the intimate mixing of the air and the water thereby forming the minute dispersion of bubbles in the water. The static shear element can be of any known design.

The third main element of the static shear tube is the distribution cap 106. The distribution cap can be of any construction ranging from a slotted to a perforated cap as long as it accomplishes the function of uniformly dispersing the aerated water horizontally out of the static shear tube.

In operation, the static shear tube is maintained in a position so that the air distribution slots are partially immersed in the water layer. Water and surfactant maintained at a higher pressure than the hydrostatic pressure in the flotation chamber enter into the open bottom end of the static shear tube. As the water rises upwardly through the tube it contacts pressurized air which has entered the tube by way of the air distribution slots 102. The air and water both move upwardly through the tube into the static shear element 104. There the air and water are intimately mixed forming minute air bubbles which are then dispersed throughout the water. This aerated water continues upwardly through the tube and horizontally exits the tube by means of a distribution cap 106.

Returning to FIG. 1, one or more static shear tubes 100 are located in the feed well 22. These extend from the bottom conical portion 34 of the feed well through the feed well plate with the distribution cap 106 located just above and adjacent to the feed well plate 40. One or more of these tubes may project above or extend into the pulp feed inlet 30. As shown in FIG. 2, the pressurized air and water layers, 36 and 38, are maintained at predetermined levels so that the air distribution slots 102 are partially in the water layer and partially in the air layer. As the water (and surfactant) enter the open bottom of the static shear tube 100 and more upwardly in the tube, the water contacts the air entering through the air distribution slots 102. In the static shear element 104 the air and water (and surfactant) are intimately mixed forming dispersed minute air bubbles. The aerated water continues upwardly through the tube and exits horizontally through the distribution cap 106 across the feed well plate. This aerated body of water then carries the floatable fractions of the pulp aqueous feed upwardly and horizontally into the air flotation chamber 20.

The usual flotation reagents may be added to the pulp aqueous feed before being introduced into the feed well 22.

More specifically, the feed well 22 is provided with a slotted dispersion sleeve 24. Aerated pulp flows not only upwardly out of the pulp feed well 22 but also through the operatives in the slotted dispersion sleeve 24. The presence of slots in the slotted dispersion sleeve 24 tends to reduce turbulence and boiling and to disperse the content of the feed well less vigorously than if no slots were used. The elongated circumferential arrangement of the slots provides a ribbon-like radial flow offering maximum exposure to the bubbles rising in the flotation chamber 20.

The froth that forms on the upper surface of the aqueous pulp in the flotation chamber 20 contains the floatable particles from the aqueous pulp which overflows into the annular froth overflow launder 26 and/or the radial launder (not shown) and out of the overflow discharge 28. The essentially non-floatable particles entering the flotation chamber 20 gravitate downwardly to be discharged through the discharge pipe 50.

The flotable particles which were not caught and floated at the feed well 22 settle through the flotation chamber 20. During this settling, they are subjected to continuous floating action by the rising air bubbles in the flotation chamber 20. The pulp feed is thereby separated in the manner described in U.S. Pat. Nos. 3,371,779 and 4,287,054 into the various constituents.

The air bubbles rising through the flotation chamber 20 are formed by the static shear tubes 100 located in the plenum chamber 60 adjacent to the bottom portion of the flotation chamber 20. The flotation chamber 20 and the plenum chamber 60 are separated from each other in this embodiment by a flotation chamber floor plate 62 disposed substantially horizontally across the air flotation cell.

Extending through the floor plate 62 are a plurality of static shear tubes 100. These tubes operate in a manner described hereinabove to generate aerated water. The minute air bubbles in this aerated water rise through the flotation chamber and cause the separation of the floatable and non-floatable particles.

Pressurized air enters the plenum chamber 60 through at least one air inlet 64. Pressurized water and surfactant enter through at least one water inlet 66. In the plenum chamber 60 there are maintained two separate layers, the bottom layer 68 being water and surfactant while the upper layer is pressurized air 70.

These layers are maintained at predetermined levels in order that the air distribution slots 102 in the static shear tubes 100 are partially in the water layer 68 and partially in the air layer 70 of the plenum chamber 60. The water (and surfactant) enter the bottom open end of the static shear tube and move upwardly in the tube where they are contacted with the pressurized air entering through the air distribution slots 102. In the static shear element 104 of the tube, the air and water are intimately mixed thereby forming a dispersion of minute air bubbles. This aerated water continues upwardly into the distribution cap 106 which is located above and adjacent to the flotation chamber floor plate 62. The aerated water then exits the distribution cap horizontally across the floor plate 62. As there is a plurality of distribution caps located adjacent and above the floor plate 62, there is a uniform dispersal of aerated water across the entire floor plate 62. This results in a uniform pattern of air bubbles rising through the flotation chamber 20 which efficiently separates the floatable and nonfloatable particles of the pulp feed.

One or more baffle section 61 of "egg crate" construction or constructed of perforated plates having large holes, e.g., four inches in diameter, can be positioned in the flotation chamber to assist in calming the turbulence within the flotation chamber. Preferably, one baffle is employed immediately above the feed well 22 and one is employed immediately below the feed well, but placement of the baffle sections will be determined by the specific application of the flotation device.

Static shear tubes are employed in both the feed well 22 and the plenum chamber 60 of the present invention. The air introduced into the feed well 22 and plenum chamber 60 is maintained at a pressure necessary to overcome the hydrostatic pressures and to expose the air distribution slots in the shear tubes. Air pressure employed in pilot work in phosphate flotation has been about 15 psig or less. The water pressure for the plenum chamber and feed well depends upon the geometry of the flotation device and on other design criteria. Pilot plant work with phosphate flotation has employed a pressure of about 15 psig or less. Volume conditions are more important and depend upon specific applications.

The dimensions of the static shear tubes employed in the air flotation cell of the present invention can vary according to specific services of the air flotation cell and static shear elements used.

The flotation chamber floor plate may be inclined either toward the discharge pipe 50 or toward the wall of the cell to facilitate discharge of the heavier particles. This discharge from the discharge pipe may be controlled by any known means.

As can be readily seen from the foregoing, the use of aspirators and apertured constriction plates as required by the Hollingsworth devices has been eliminated. The present invention employs static shear tubes both in the feed well and in the plenum chamber instead of aspirators and constriction plates. By using these static shear tubes, the air flotation cell operates much more efficiently and economically. While the descriptions provided hereinabove describe the principles of the present invention it is to be understood that this description is made only by way of example and is not intended as a limitation to the scope of the invention.

What is claimed is:
1. Air flotation cell for separation of floatable and non-floatable particles from an aqueous pulp feed by froth flotation comprising,
 (a) an air flotation chamber to receive said aqueous pulp,
 (b) pulp feed means for introducing aqueous pulp feed into said flotation chamber,
 (c) froth overflow means disposed adjacent to the upper end of the flotation chamber for discharging therefrom particles of said aqueous pulp,
 (d) a plenum chamber disposed adjacent to the bottom of the flotation chamber, said plenum chamber being adapted to contain an upper layer of air and a bottom layer of water,
 (e) a substantially horizontal flotation chamber floor plate disposed between said flotation chamber and said plenum chamber,
 (f) means for introducing air and water into said plenum chamber,
 (g) underflow means for discharging a non-float fraction containing unfloated particles of said aqueous pulp from said flotation chamber, said underflow means including a discharge duct which opens through said flotation chamber floor plate,
 (h) a plurality of static shear tubes for aerating water extending through said flotation chamber floor plate and connecting said plenum chamber with said flotation chamber wherein said static shear tubes conduct air and water from said plenum chamber into said flotation chamber, and wherein said static shear tube comprises a tube having two ends and an enclosed wall disposed between said two ends, one of said ends being open and the other end having a partially open distribution cap thereon, a static shear element inside the tube adjacent the end having the distribution cap, and at least one open inlet slot in said wall.

2. The air flotation cell of claim 1 wherein said at least one open inlet slot is located adjacent said open end of said tube.

3. The air flotation cell of claim 1 wherein said distribution cap is closed at the top and has distribution means for distributing the aerated water horizontally across the flotation chamber floor plate.

4. The air flotation cell of claim 1 wherein said plurality of aerating and conducting means are distributed uniformly through said flotation chamber floor plate.

5. The air flotation cell of claim 1 wherein said flotation chamber includes at least one baffle section extending laterally across said chamber.

6. A feed well device for use in an air flotation cell comprising,
 (a) a chamber having an open upper end and a closed bottom,
 (b) a plate dividing said chamber into upper and lower compartments,
 (c) means for introducing water and air into said lower compartment,
 (d) at least one static shear tube for aerating water extending through said plate and connecting said lower and upper compartments wherein said static shear tube conducts water and air from said lower compartment into said upper compartment, wherein said static shear tube comprises a tube having two ends and an enclosed wall disposed between said ends, one of said ends being open and the other end having a partially open distribution cap, a static shear element inside the tube adjacent said end having said distribution cap, and at least one open inlet slot in said wall.

7. The feed well of claim 6 wherein said at least one open inlet slot is located adjacent said open end of said tube.

8. The feed well of claim 6 wherein said distribution cap is closed at the top and has distribution means for distributing the aerated water horizontally across said plate.

9. Air flotation cell for separation of floatable and non-floatable particles from an aqueous pulp feed by froth flotation comprising,
 (a) an air flotation chamber to receive said aqueous pulp,
 (b) pulp feed means for introducing aqueous pulp feed into said flotation chamber, (c) froth overflow means disposed adjacent to the upper end of the flotation chamber for discharging therefrom particles of said aqueous pulp, (d) a plenum chamber disposed adjacent to the bottom of the flotation chamber, said plenum chamber being adapted to contain an upper layer of air and a bottom layer of water, (e) a substantially horizontal flotation chamber floor plate disposed between said flotation chamber and said plenum chamber, (f) means for introducing air and water into said plenum chamber, (g) underflow means for discharging a non-float fraction containing unfloated particles of said aqueous pulp from said flotation chamber, said underflow means including a discharge duct which opens through said flotation chamber floor plate, (h) a plurality of static shear tubes for aerating water extending through said flotation chamber floor plate and connecting said plenum chamber with said flotation chamber wherein said static shear tubes conduct air and water from said plenum chamber into said flotation chamber, (i) a feed well device comprising,
  (i) a chamber having an open upper end and closed bottom,
  (ii) a plate dividing said chamber into upper and lower compartments,
  (iii) means for introducing water and air into said lower compartment,
  (iv) at least one static shear tube extending through said plate and connecting said lower and upper compartments wherein said static shear tube conducts air and water from said lower compartment into said upper compartment, wherein said static shear tube comprises a tube having two ends and an enclosed wall disposed between said ends, one of said ends being open and the other end having a partially open distribution cap, a static shear element inside the tube adjacent said end having said distribution cap, and at least one open inlet slot in said wall.

10. The air flotation cell of claim 9 wherein said at least one open inlet slot is located adjacent said open end of said tube.

11. The air flotation cell of claim 9 wherein said distribution cap is closed at the top and has distribution means for distributing the aerated water horizontally across said plate.

12. The air flotation cell of claim 9 wherein said flotation chamber includes at least one baffle section extending laterally across said flotation chamber.

* * * * *